(12) United States Patent
Tong

(10) Patent No.: US 8,776,562 B2
(45) Date of Patent: Jul. 15, 2014

(54) SYSTEM AND METHOD FOR AUTOMATING LOCK CYLINDER PINNING FOR REMOTE USERS

(75) Inventor: Mike Yueh-Ming Tong, Bellevue, WA (US)

(73) Assignee: GMS Industries, Inc., Bellevue, WA (US)

( * ) Notice: Subject to any disclaimer, the term of this patent is extended or adjusted under 35 U.S.C. 154(b) by 374 days.

(21) Appl. No.: 13/250,612

(22) Filed: Sep. 30, 2011

(65) Prior Publication Data
US 2013/0084142 A1   Apr. 4, 2013

(51) Int. Cl.
E05B 15/00 (2006.01)
E05B 17/00 (2006.01)
E05B 27/00 (2006.01)

(52) U.S. Cl.
CPC ......... *E05B 17/0004* (2013.01); *B23C 2235/12* (2013.01); *E05B 27/00* (2013.01)
USPC .......................................................... 70/442

(58) Field of Classification Search
USPC ......... 29/592; 70/442, 493, 264, 340; 409/81; 340/5.65, 6.67; 707/805, 999.004, 707/999.001, 999.104
See application file for complete search history.

(56) References Cited

U.S. PATENT DOCUMENTS

| 5,552,777 | A * | 9/1996 | Gokcebay et al. | 340/5.54 |
| 6,520,898 | B1 * | 2/2003 | Moen | 493/52 |
| 8,166,784 | B2 * | 5/2012 | Tong | 70/493 |
| 8,312,709 | B2 * | 11/2012 | Mueller et al. | 60/284 |

* cited by examiner

*Primary Examiner* — John C Hong
(74) *Attorney, Agent, or Firm* — Michael J. Donohue; Davis Wright Tremaine LLP

(57) ABSTRACT

A system allows the remote entry of pin data to manufacture a customized lock cylinder assembly. A remote computer communicates with a cylinder manufacturing system (or website) to upload user-selected pin data. The pin data may be stored for future reorders or additional orders. A pinning machine receives the pin data and automatically selects pins to manufacture a customized lock cylinder assembly. The lock cylinder assembly may be completed in seconds and shipped to the user thereby eliminating the need for manual lock customization. In addition, key code data may be provided to a key manufacturing system to automatically manufacture keys corresponding to the customized lock cylinder assembly.

10 Claims, 8 Drawing Sheets

|  | CHAMBER 1 | CHAMBER 2 | CHAMBER 3 | CHAMBER 4 | CHAMBER 5 |
|---|---|---|---|---|---|
| Top Pin | 1 | 1 | 1 | 1 | 1 |
| Master Pin | 4 | 3 | 2 | 4 | 4 |
| Bottom Pin | 4 | 5 | 2 | 1 | 4 |

FIG. 6

| JOB ID | KEY ID | QUANTITY | CHAMBER 1 | CHAMBER 2 | CHAMBER 3 | CHAMBER 4 | CHAMBER 5 |
|---|---|---|---|---|---|---|---|
| XYZ | A-1 | 100 | 4 | 8 | 2 | 1 | 4 |
| XYZ | A-2 | 50 | 2 | 8 | 2 | 1 | 1 |
| XYZ | A-3 | 1000 | 6 | 8 | 4 | 1 | 1 |
| XYZ | MK | 1 | 8 | 5 | 4 | 5 | 8 |

FIG. 7

| Job ID | Cylinder ID | Quantity | Pins | Chamber 1 | Chamber 2 | Chamber 3 | Chamber 4 | Chamber 5 |
|---|---|---|---|---|---|---|---|---|
| XYZ | A1 | 10 | Top | 1 | 1 | 1 | 1 | 1 |
| XYZ | A1 | 10 | Master | 4 | 3 | 2 | 4 | 4 |
| XYZ | A1 | 10 | Bottom | 4 | 5 | 2 | 1 | 4 |
| XYZ | A2 | 20 | Top | 1 | 1 | 1 | 1 | 1 |
| XYZ | A2 | 20 | Master | 6 | 3 | 2 | 4 | 4 |
| XYZ | A2 | 20 | Bottom | 2 | 5 | 2 | 1 | 4 |
| XYZ | A3 | 50 | Top | 1 | 1 | 1 | 1 | 1 |
| XYZ | A3 | 50 | Master | 2 | 3 | 2 | 4 | 4 |
| XYZ | A3 | 50 | Bottom | 6 | 5 | 2 | 1 | 4 |

FIG. 8

| Order ID | User ID | Job ID | Cylinder ID | Quan. | Pins | Chamber 1 | Chamber 2 | Chamber 3 | Chamber 4 | Chamber 5 |
|---|---|---|---|---|---|---|---|---|---|---|
| 1001 | MT | XYZ | A1 | 10 | Top Pin | 1 | 1 | 1 | 1 | 1 |
| 1001 | MT | XYZ | A1 | 10 | Master Pin | 4 | 3 | 2 | 4 | 4 |
| 1001 | MT | XYZ | A1 | 10 | Bottom Pin | 4 | 5 | 2 | 1 | 4 |
| 1001 | MT | XYZ | A2 | 20 | Top Pin | 1 | 1 | 1 | 1 | 1 |
| 1001 | MT | XYZ | A2 | 20 | Master Pin | 6 | 3 | 2 | 4 | 4 |
| 1001 | MT | XYZ | A2 | 50 | Bottom Pin | 2 | 5 | 2 | 1 | 4 |
| 1001 | MT | XYZ | A3 | 50 | Top Pin | 1 | 1 | 1 | 1 | 1 |
| 1001 | MT | XYZ | A3 | 50 | Master Pin | 2 | 3 | 2 | 4 | 4 |
| 1001 | MT | XYZ | A3 | 50 | Bottom Pin | 6 | 5 | 2 | 1 | 4 |
| 1002 | MT | ACME | A1 | 20 | Top Pin | 1 | 1 | 1 | 1 | 1 |
| 1002 | MT | ACME | A1 | 20 | Master Pin | 4 | 7 | 2 | 4 | 4 |
| 1002 | MT | ACME | A1 | 20 | Bottom Pin | 4 | 2 | 2 | 1 | 4 |
| 1002 | MT | ACME | A2 | 10 | Top Pin | 1 | 1 | 1 | 1 | 1 |
| 1002 | MT | ACME | A2 | 10 | Master Pin | 4 | 4 | 2 | 4 | 4 |
| 1002 | MT | ACME | A2 | 10 | Bottom Pin | 4 | 5 | 2 | 1 | 4 |
| 1003 | GC | SEATAC | A1 | 5 | Top Pin | 1 | 1 | 1 | 1 | 1 |
| 1003 | GC | SEATAC | A1 | 5 | Master Pin | 4 | 3 | 2 | 4 | 2 |
| 1003 | GC | SEATAC | A1 | 5 | Bottom Pin | 4 | 5 | 2 | 1 | 2 |
| 1003 | GC | SEATAC | A2 | 10 | Top Pin | 1 | 1 | 1 | 1 | 1 |
| 1003 | GC | SEATAC | A2 | 10 | Master Pin | 6 | 3 | 2 | 4 | 4 |
| 1003 | GC | SEATAC | A2 | 10 | Bottom Pin | 2 | 5 | 2 | 1 | 0 |

SYSTEM AND METHOD FOR AUTOMATING LOCK CYLINDER PINNING FOR REMOTE USERS

BACKGROUND OF THE INVENTION

1. Field of the Invention

The present disclosure is directed techniques for the selection and insertion of pins into lock cylinders and, more specifically, to a system and method for automating lock cylinder pinning for remote users.

2. Description of the Related Art

Lock cylinders are part of lock sets that consumers buy and use every day. They are pinned up (i.e., coded) at factories to ensure that each lock set requires a key to operate. As those skilled in the art will appreciate, each lock cylinder has pins of a selected length that are used to encode the particular lock cylinder. When a key of the proper shape is inserted into the cylinder, the pins align in such a manner that the cylinder can rotate within the housing. To save time and labor, lock cylinders are often pinned by sophisticated and expensive automatic pinning machines.

Typically, the lock cylinders are pinned randomly as they are produced at factories. However, sometimes the pinning is customized so that the cylinders will work as a system to control access. For example, such customized pinning may be used to allow a master key to access all offices in a building while staff keys can be used only to access specific locks within the building. Because customized pinning is a small portion of a factory's production, and requires much more sophisticated coding, customized pinning is usually performed manually. In this case, the cylinders are pinned manually resulting in a significant increase in the cost for customized lock cylinders. Accordingly, it can be appreciated that there is a significant need for techniques that allow the production of customized locks using automatic pinning machines. The present invention provides this, and other advantages, as will be apparent from the following detailed description and accompanying figures.

BRIEF DESCRIPTION OF THE SEVERAL VIEWS OF THE DRAWING(S)

FIG. 6 is a table illustrating the selection of pins for a customized lock.

FIG. 7 is a table illustrating the selection of key code data to permit the automatic manufacturing of keys by the key manufacturing system of FIG. 3.

FIG. 8 illustrates a data storage structure showing the selection of multiple customized cylinders to fulfill a customer order.

FIG. 9 illustrates a data storage structure showing multiple orders from multiple users.

DETAILED DESCRIPTION OF THE INVENTION

The present disclosure is directed to techniques for selecting customized pin codes and remotely providing a data set for the customized pin codes so that an automatic pinning machine may conveniently produce sets of customized lock cylinders.

Figure 1:
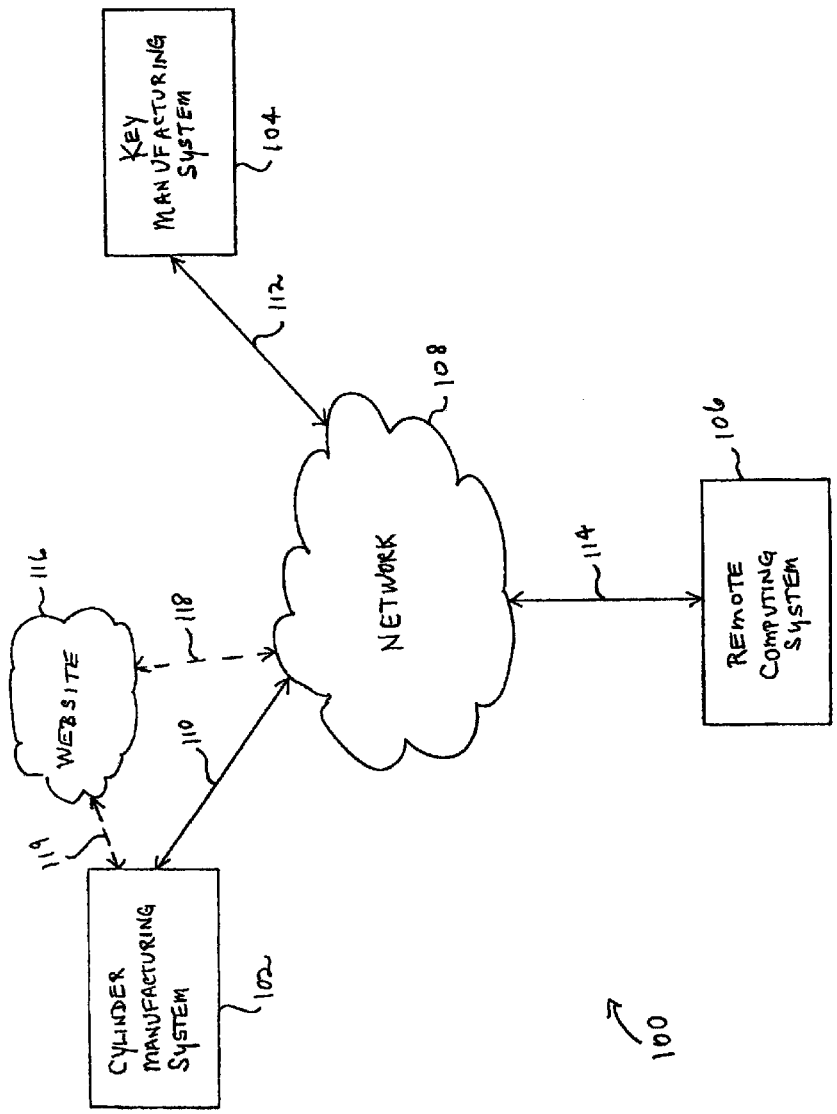
FIG. 1 is a diagram illustrating network architecture used by the system disclosed herein.

The invention is illustrated in an example embodiment as a system 100, illustrated in FIG. 1. The system 100 includes a cylinder manufacturing system 102, a key manufacturing system 104, and a remote computing system 106. The various systems 102-106 are each coupled to a network 108. As illustrated in FIG. 1, the cylinder manufacturing system 102 is coupled to the network 108 via a communication link 110. Similarly, the key manufacturing system 104 is coupled to the network 108 via a communication link 112, while the remote computing system 10 is coupled to the network 108 via a communication link 114.

The network 108 is illustrated in FIG. 1 in a generic form. Those skilled in the art will appreciate that the network 108 is representative of one or more forms of network implementation. For example, the network 108 may represent a local area network (LAN) or a wide area network (WAN), such as the Internet. In one embodiment, the three systems 102-106 communicate with each other via the network 108 implemented as a WAN, such as the Internet. However, it is also possible for portions of the system 100 to communicate via a LAN. For example, the cylinder manufacturing system 102 and the key manufacturing system 104 may be commonly owned. In this example, the cylinder manufacturing system 102 may communicate with the key manufacturing system 104 via the LAN. As such, the network 108 is intended to represent a LAN for purposes of communication between the cylinder manufacturing system 102 and the key manufacturing system 104. The various implementations of a network, such as the network 108, are well known in the art and need not be described in greater detail herein.

Communication with the cylinder manufacturing system 102 may occur via a website 116. As those skilled in the art will appreciate, a website may provide the necessary customer support in the selection of particular lock cylinders and the selection of customized pin data. Rather than communicate directly with the cylinder manufacturing system 102 via the communication link, the remote computing system 106 communicates with the website 116 via the communication link 118. In turn, the website 116 communicates with the cylinder manufacturing system 102 via a communication link 119. The website 116 offers advantages such as customer identification and authentication (e.g., password protection), which may be performed in a conventional manner. When the customer has entered the appropriate user name and password, the website 116 can provide information regarding available lock cylinder types, manufacturing lead times, cost data, and the like. In addition, the website 116 provides the appropriate user interface to retrieve stored pin data from previous orders.

Figure 2:
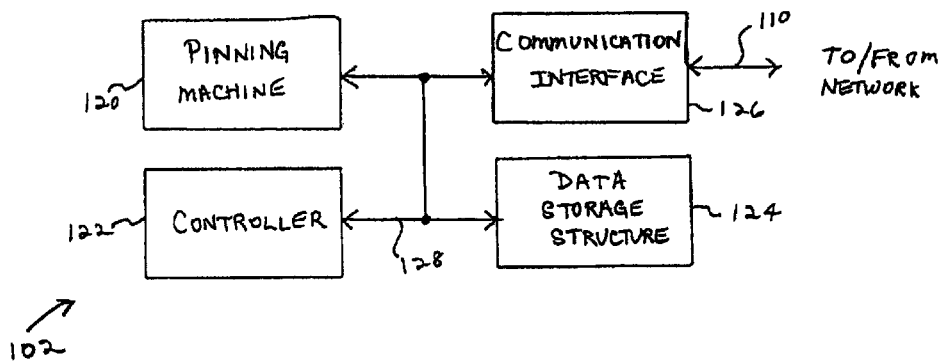
FIG. 2 is a functional block diagram of the cylinder manufacturing system of FIG. 1.

FIG. 2 is a functional block diagram of the cylinder manufacturing system 102. As illustrated in FIG. 2, the cylinder manufacturing system 102 comprises a pinning machine 120 and an associated controller 122. The controller 122 may be implemented as a conventional computer (e.g., a PC), microprocessor, microcontroller, or the like. Alternatively, the controller 122 may be a portion of a commercially available manufacturing control system. The operation of a pinning machine is well known in the art and need not be described in detail herein. However, the controller 122 provides pin codes to the pinning machine 120 to instruct the pinning machine to select specific pins for insertion into a lock cylinder. This process will be described in greater detail below.

FIG. 2 also illustrates a data storage structure 124 and a communication interface 126. The communication interface 126 allows the cylinder manufacturing system 102 to communicate with other components in the system 100 via the network 108. The communication interface 126 may generically represent multiple interface types. For example, the communication interface 126 may allow the cylinder manufacturing system 102 to communicate with the remote computing system 106 via the Internet (i.e., the WAN network 108). At the same time, the communication interface 126 may represent a LAN interface to allow the cylinder manufacturing system 102 to communicate with the key manufacturing system 104 via the LAN implementation of the network 108. For the sake of brevity, the communication interface 126 is intended to illustrate conventional communication controllers commonly used in a network environment.

The data storage structure 124 may conveniently store pin selection data and identification data provided to the cylinder manufacturing system 102 by the remote computing system 106 (see FIG. 1) either directly or via the website 116. The data storage structure 124 may conveniently retain the received pin code and identification data for future reference. Those skilled in the art will appreciate that the data storage structure 124 may be satisfactorily implemented in a variety of different embodiments. The data storage structure could, for example, be a data table, spreadsheet, database, look-up table, or the like. The specific implementation of the data storage structure 124 is not critical to the operation of the cylinder manufacturing system 102 or the overall operation of the system 100. Thus, the system 100 is not limited by any specific implementation of the data storage structure 124.

The various system components in FIG. 2 are coupled together by a bus system 128. The bus system 128 may include internal busses, such as are common in a printed circuit board, to provide power, data, and control functions to the cylinder manufacturing system 102.

In one embodiment, the components in FIG. 2 may be integrated into a single device. For example, the pinning machine 120 may include an internal controller 122, data storage structure 124, and communication interface 126. In this embodiment, the bus system 128 may be an internal bus system of the pinning machine 120.

In an alternative embodiment, the controller 122 may be a separate component, such as a personal computer (PC), machine controller, or the like. In this embodiment, the data storage structure 124 and communication interface 126 may be integrated into the controller 122. In this embodiment, the bus system 128 may represent an internal bus system of the controller 122 as well as an external system, such as a LAN cable, between the controller 122 and the pinning machine 120. The cylinder manufacturing system 102 is not limited by the specific architecture illustrated in the example of FIG. 2.

Figure 3:
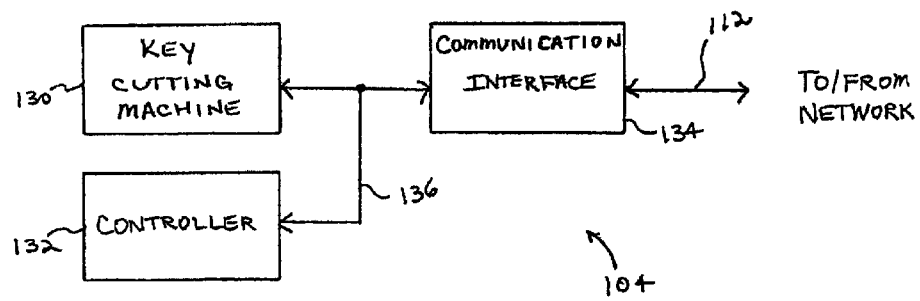
FIG. 3 is a functional block diagram of the key manufacturing system of FIG. 1.

FIG. 3 is a functional block diagram of the key manufacturing system 104 (see FIG. 1). As appreciated by those skilled in the art, a customized lock cylinder generated by the cylinder manufacturing system 102 will require a customized key (or keys), which is manufactured by the key manufacturing system 104. As illustrated in FIG. 3, the key manufacturing system 104 comprises a key cutting machine 130 and a controller 132. A typical low-cost key cutting machine in a local hardware store uses an already cut key as a template for cutting a new matching key. In contrast, the key cutting machine 130 is a computer-controlled device that manufactures a new key without an existing key to use as a template. Instead, the controller 132 provides the key cutting machine 130 with key code data corresponding to the customized lock cylinder. As will be discussed in greater detail below, the key code data relates to the length of pins in each position in a lock cylinder. Thus, the key code data informs the key cutting machine 130 of the position and depth of notches that must be cut in a blank key.

FIG. 3 also illustrates a communication interface 134, which couples the key manufacturing system 104 to the network 108 via the communication link 112. As discussed above with respect to the communication interface 126, the communication interface 134 is intended to represent one or more kinds of conventional communication interfaces to permit communication via a LAN implementation of the network 108, a WAN implementation of the network 108 or a combination of the LAN and WAN.

FIG. 3 illustrates a bus system 136 to couple together the various components of the key manufacturing system 104. In one embodiment, the key cutting machine 130 may be a stand-alone device with an integrated version of the controller 132 and the communication interface 134. In this embodiment, the bus system 136 may be an internal bus system to provide data, power, control, and the like between the various components. In an alternative embodiment, the controller 132 may be a stand-alone device, such as a PC or machine controller. In this embodiment, the bus system 136 may be implemented as a network element, such as an ethernet cable. In this embodiment, the communication interface 134 may be integrated into the key cutting machine 130 to permit control by the controller 132. A second instance of the communication interface 134 may be provided in the key manufacturing system 104 to permit communication with the network 108.

Figure 4:
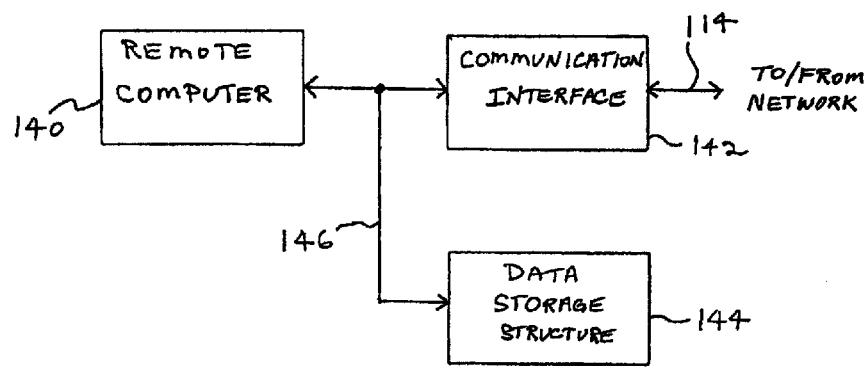
FIG. 4 is a functional block diagram of the remote computing system of FIG. 1.

FIG. 4 is a functional block diagram illustrating the remote computing system 106 (see FIG. 1). The remote computing system 106 comprises a remote computer 140, which may be typically implemented as a conventional PC, laptop, or other known computing device. A communication interface 142 allows the remote computing system 106 to communicate with the cylinder manufacturing system 102 and/or the key manufacturing system 104 via the network 108. As discussed above with other communication interfaces, the communication interface 142 is a conventional communication interface and is intended to represent one or more such interface types. For example, the communication interface 142 may be a WAN interface to allow the remote computing system 106 to communicate via a WAN, such as the Internet. In an alternative embodiment, the remote computing system 106 may be coupled to the cylinder manufacturing system 102 and/or the key manufacturing system 104 via a LAN. In this embodiment, the communication interface 142 may be a LAN interface. The communication interface 142 may include both LAN and WAN interface capabilities. Thus, the remote computing system 106 is not limited by the specific form or number of the communication interface 142.

FIG. 4 also illustrates a data storage structure 144. The data storage structure 144 may be used to store pin and key code data in a manner that will be described in greater detail below. As noted above, the data storage structure 124 in the cylinder manufacturing system 102 (see FIG. 2) also stores pin and key code data. Similarly, the data storage structure 144 in the remote computing system 106 may temporarily store pin code data awaiting transmission to the cylinder manufacturing system 102 or the key manufacturing system 104. Alternatively, the data storage structure 144 may archive pin and key code data to maintain a permanent record or for future use to create additional lock cylinders having pin lengths corresponding to the stored pin and key code data in the data storage structure 144. As discussed above with respect to the data storage structure 124 in FIG. 2, the data storage structure 144 may be implemented in any convenient fashion. The data storage structure 144 may be a data look-up table, database, spreadsheet, or the like. The remote computing system 106 is not limited by the specific form of the data storage structure 144. In addition, the data storage structure 144 need not be the same arrangement as the data storage structure 124 in FIG. 2.

The components illustrated in FIG. 4 are coupled together by a bus system 146. The bus system 146 may include address, data, power, and control signals. The bus system 146 may be an internal bus system if the communication interface 142 and data storage structure 144 are integrated into the remote computer 140. Alternatively, the bus system 146 may represent a connector cable or interface cable connecting the elements of the remote computing system 106.

Many conventional components of the remote computing system 106 have been omitted for brevity and for the sake of clarity. However, those skilled in the art will appreciate that the remote computer 140 will include conventional components such as a display, keyboard, cursor control device (e.g., a mouse), disk storage, optical storage, and the like. For the sake of clarity, those conventional components have been omitted from FIG. 4.

The system 100 allows the user to customize pin selection for lock cylinders and to control the cylinder manufacturing system 102, key manufacturing system 104, and the automatic production of such customized lock cylinders. This may include the manufacture of a plurality of lock cylinders having the same pin code data. This would allow multiple locks to be opened with the same key, which is common in a house where a front door, back door, side door, garage door, and the like can be opened with a single key. In another embodiment, lock cylinders can be customized for use with individual keys and a master key. In this arrangement, individual keys can open any lock having the corresponding pin code, while a master key can open any lock. This arrangement is common in an office setting where individual keys can be used to open locks on individual offices, while a master key can be used to open any of the offices.

Figure 5:
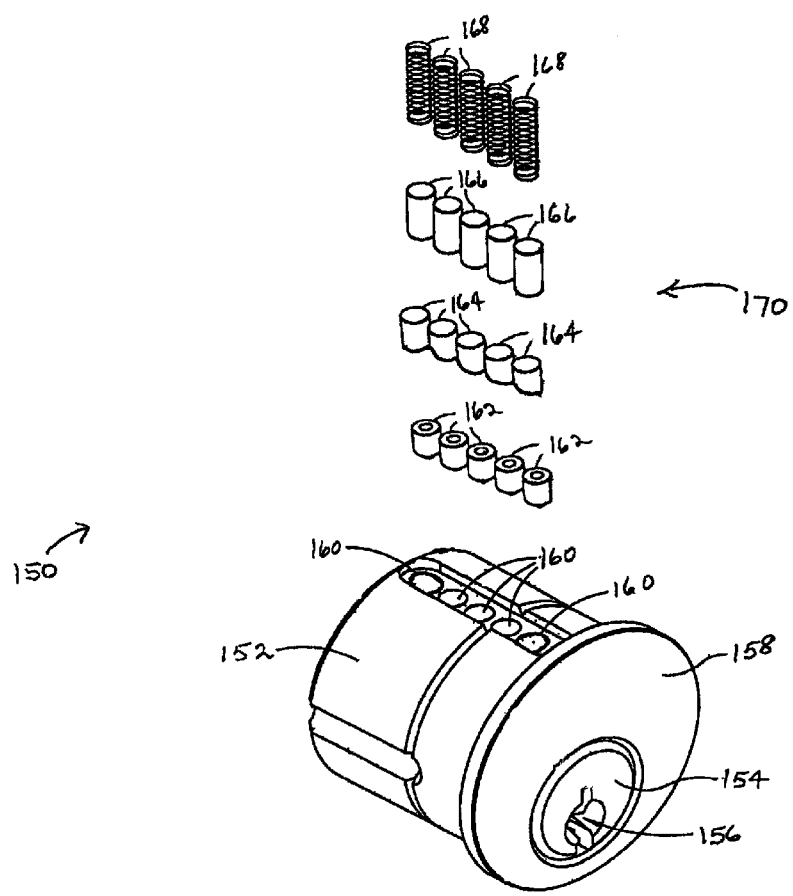
FIG. 5 illustrates a lock cylinder assembly constructed using the automatic pinning system of FIG. 1.

FIG. 5 is an exploded view of a lock cylinder assembly 150 illustrating the insertion of pins selected by pin code data in the present system. The lock cylinder assembly 150 comprises a cylinder housing 152 and a plug 154. A key (not shown) is inserted into a key way passage 156. A faceplate/shoulder 158 at one end of the cylinder housing 152 allows the cylinder housing to be inserted into a properly sized hole in a door or other structure.

The cylinder housing 152 includes a number of pin chambers 160 positioned along at least a portion of the length of the key way passage 156. In the example of FIG. 5, there are a total of five pin chambers 160. However, the principles disclosed herein are applicable to lock cylinder assemblies having a greater or lesser number of pin chambers 160. Thus, the system 100 is not limited by the particular number of pin chambers 160 in the lock cylinder assembly 150.

FIG. 5 also illustrates three sets of pins used with the lock cylinder assembly 150 for use with a master key. A set of key pins or bottom pins 162 are initially inserted into the respective pin chambers 160. A set of master pins 164 are then inserted into the pin chambers. Each master pin 164 rests upon the corresponding bottom pin 162 in each pin chamber 160. Following the insertion of the master pins 164, each pin chamber 160 receives a drive pin or top pin 166. Finally, a spring 168 is inserted into each pin chamber 160. The springs 168 apply a force on the corresponding bottom pins 162 via the master pins 164 and top pins 166. Thus, the bottom pins 162 are urged downward and partially extend into the keyway passage 156. The combination of pins (i.e., the bottom pins 162, middle pins 164, and top pins 166), and spring 168 may collectively be referred to as the pin assemblies 170.

The general operation of a key and lock cylinder assembly is well known in the art and need not be described in greater detail herein. Furthermore, the operation of lock cylinder assemblies with a master key, such as the lock cylinder assembly 150 in FIG. 5, is also well known in the art and need not be described in greater detail herein. With respect to the cylinder manufacturing system 102 (see FIG. 1), a lock cylinder assembly with no master pins in the pin assemblies can be represented by a single numeric code, if the top pin has an identical value for each pin chamber. Thus, in one embodiment, a single numeric value could represent the bottom pin length in each pin chamber. In an exemplary embodiment, each pin chamber may have two numeric values representing the bottom pin and the top pin lengths, respectively. In yet another embodiment, a single master pin may be added to each pin chamber thus requiring a total of three numeric values for each pin chamber. Furthermore, it is possible to add more than one master pin for each pin chamber. Thus, a larger number of numeric values may be used for each pin chamber to represent the multiple master pins. Therefore, one can appreciate that the system 100 provides the user a wide range of options that are completely user-selectable.

For the sake of convenience, the bottom pins 162 are all illustrated as having the same length. Similarly, each master pin 164 is illustrated in FIG. 5 as having an identical length. Finally, FIG. 5 illustrates the top pins 166 as having identical length. In an actual implementation, the lengths of the various pins in the pin assembly 170 are selected on the basis of pin code data and are typically not the same length.

As will be discussed below, the various pins in the pin assembly 170 come in different incremental lengths with each length having a corresponding numeric value. While the incremental lengths are not uniform across the industry, each manufacturer provides pins in multiple lengths. As will be described in greater detail below, the incremental length for each manufacturer has a corresponding numeric value. For example, if there are ten different lengths of the bottom pins, then a single digit ranging between 0-9 can be used to represent the different lengths. In an exemplary embodiment, the pin code number 0 corresponds to the shortest length while the pin code value 9 represents the longest length available for the bottom pins 162.

FIG. 6 illustrates example pin code values for a single lock cylinder assembly 150. By convention, the first pin chamber 160 (i.e., chamber 1) is the pin chamber closest to the entrance to the key way passage 156 (see FIG. 5) at the front of the lock cylinder assembly 150. In this example, there are five pin chambers 160 where each chamber has a bottom pin 162, a master pin 164, and top pin 166. As noted above, the numeric values for the pin code data correspond to the selected incremental pin length. FIG. 6 clearly shows how a particular lock cylinder assembly 150 can be pinned (i.e., coded) for each of the respective pin chambers 160. The pin code data in FIG. 6 provides sufficient information for the cylinder manufacturing system 102 to perform its task and create a customized lock.

FIG. 7 illustrates example key code values for various keys, including a master key (MK). In a system where the lock cylinder assembly 150 has no master key, the pin code data will only include data for the top pin and bottom pin. In this embodiment, the key code data may be automatically derived by the system 100 based on the pin code data for a particular lock cylinder assembly 150. Those skilled in the art will appreciate that a lock cylinder assembly 150 with master pins can have a variety of different key code possibilities with a given set of pin code data. For this reason, the user must explicitly provide key code data to the key manufacturing system 104 (see FIG. 1). Typically, the user may provide the key code data for the master key and regular keys from the remote computing system 106.

FIG. 8 illustrates data for customizing a larger number of lock cylinder assemblies 150. In the data of FIG. 8, a Job ID column allows the system 100 to identify a particular customer. A Cylinder ID value identifies a particular cylinder model and quantity of each cylinder model. In the example of FIG. 8, the entire task is for a single customer and has three different pin code arrangements. For cylinder type A1, ten locks will be created using the pin code data shown in the remaining lines of the table. The same customer receives twenty lock cylinder assemblies using the pin code illustrated in the table and identified as a cylinder ID A2. Finally, fifty lock cylinder assemblies of cylinder type A3 are created using the pin code data shown in the accompanying table. The data illustrated In FIG. 8 is stored in the data storage structure 124 of the cylinder manufacturing system 102. As the data is created by a user, the data may also be stored, temporarily or permanently, in the data storage structure 144 of the remote computing system 106 (see FIG. 4).

FIG. 9 expands the data illustrated in FIG. 8 to include multiple users and multiple jobs. In addition to the various identification columns discussed above with respect to FIG. 8, the data structure of FIG. 8 further includes an Order ID column as well as a User ID column. The remaining columns in FIG. 9 match the columns already discussed above.

FIG. 9 illustrates data from multiple users and, in an exemplary embodiment, is stored in the data storage structure 124 of the cylinder manufacturing system 102 (see FIG. 2). Conventional security measures, such as user ID and password, can be used to prevent one user from gaining access to data for a different user. In this manner, important data related to the lock system at a particular work site is protected so that it is not possible to surreptitiously obtain the data and manufacture unauthorized keys. More robust security systems, such as data encryption, and the like, may also be used to encrypt the data illustrated in FIG. 9.

Figure 10:
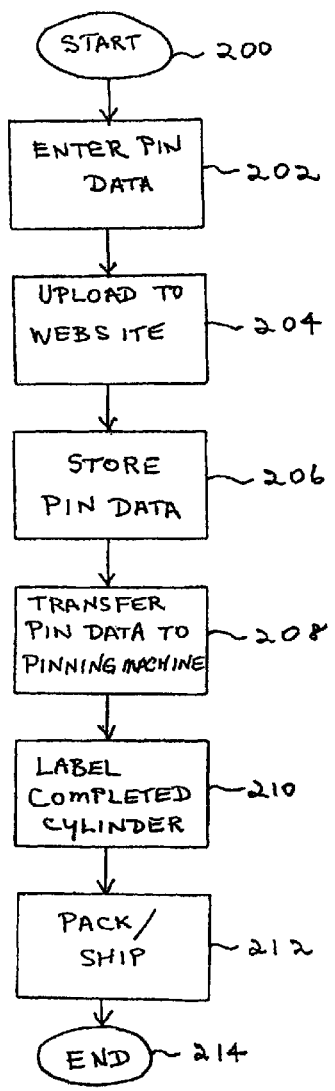
FIG. 10 is a flow chart illustrating the operation of the system described herein.

FIG. 10 is a flow chart illustrating the operation of an exemplary embodiment of the system 100. At a start 200, the various components illustrated in the diagram of FIG. 1 are in place. In step 202, the user enters the pin code data for the desired customized lock cylinder assembly 150 (see FIG. 5). In step 204, the user-selected pin code data is uploaded to the website 116 (see FIG. 1). In step 206, the received pin code data is stored in the data storage structure 124 (see FIG. 2). Those skilled in the art will appreciate that steps 202-206 can be performed in a different sequence. For example, in one embodiment the end user may enter all pin code data prior to any contact with the website 116. In this embodiment, all pin code data may be stored in the data storage structure 144 (see FIG. 4) of the remote computing system 106. The pin code data received by the cylinder manufacturing system 102 may be stored temporarily or permanently in the data storage structure 124. In another embodiment, the user may log on to the website 116 and enter pin code data in an interactive communication session. In this embodiment, the pin code data is entered and uploaded in an interactive session.

In step 208, the pin code data is transferred from the data storage structure 124 to the pinning machine 120. As described above, the controller 122 controls operation of the pinning machine 120 to select the pins (i.e., the bottom pins 162, master pins 164, and top pins 166) based on the pin code data received from the user and stored in the data storage structure 124. Thus, the pinning machine 120 automatically manufactures a customized lock cylinder assembly 150.

In step 210, the completed lock cylinder assembly 150 is labeled with appropriate identification and, in step 212, the customized lock cylinder assembly 150 is packed and shipped to the user. The process ends at 214. Thus, the system 100 simplifies the manufacturing process of customized lock cylinder assemblies. A process that used to require manual alterations to a lock cylinder assembly that took several minutes may now be accomplished automatically in just a few seconds. Furthermore, the pin code data can be stored for subsequent use if additional customized locks are required at a later time.

In addition, the key code data may be provided to the key manufacturing system 104 to permit the automatic manufacturing of keys corresponding to the pin code data that will open the customized lock cylinder assemblies 150. The user may supply key code data in a process similar to that discussed above in FIG. 8 with respect to pin code data. That is, the user enters the key code data for the desired customized lock cylinder assembly 150 (see FIG. 5). The data may be entered into the remote computing system 106 (see FIG. 1) and uploaded to the website 116. The key code data may be stored in the data storage structure 144 (see FIG. 4) of the remote computing system 106, or in the data storage structure 124 of the cylinder manufacturing system 102, on the website 116 itself, or in a data storage structure (not shown) in the key manufacturing system 104.

During the manufacturing process, the key code data is transferred to the key cutting machine 130 show in FIG. 3. The controller 132 controls operation of the key cutting machine 130 to manufacture a user-selected number of keys corresponding to the customized lock cylinder assembly 150. As discussed above, the lock cylinder assembly 150 may be manufactured for a single key or may also have one or more master keys. The user must supply the key code data that allows the key cutting machine 130 to manufacture regular keys and master keys if needed. The custom manufactured keys may be packaged and labeled with labels associating the keys with the customized lock cylinder assemblies 150 manufactured by the cylinder manufacturing system 102. The customized keys can be packed and shipped along with the lock cylinder assemblies in step 212 of FIG. 8 to provide a complete customer order.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
a pinning machine configured to receive pin code data for a plurality of pin chambers and to insert selected pins into each of the plurality of pin chambers in accordance with the pin code data for each of the respective pin chambers to thereby produce a lock cylinder having a pin arrangement governed by the received pin code data;
a data storage structure configured to store the pin code data; and
a communication interface on the pinning machine configured to receive the pin code data from a remote computing device and to store the pin code data in the data storage structure.

2. The system of claim 1 wherein the communication interface is part of a web server supporting a website wherein the pin code data is received from the remote computing device via the website.

3. The system of claim 1 wherein the data storage structure maintains a record of previous pin code data to permit the reuse of the previous pin code data.

4. The system of claim 1 wherein the data storage structure is configured to store pin code data for a plurality of lock cylinders.

5. The system of claim 1 wherein the data storage structure contains pin code data comprising a numeric code indicating a selected length of each pin to be inserted into each of the respective pin chambers.

6. The system of claim 1 wherein the data storage structure is configured to store pin code data for a master key system wherein the pin code data comprises data for a bottom pin, master pin and a top pin for each of the plurality of pin chambers.

7. The system of claim 1, further comprising a control computer configured to control operation of the pinning machine, the control computer being configured to receive the stored pin code data from the data storage structure.

8. The system of claim 1 wherein the data storage structure is part of a computing device, the computing device having a communication interface configured to communicate with a remote customer computing device and to receive the pin code data from the remote customer computing device via the computing device communication interface.

9. The system of claim 1, further comprising a key cutting machine having a communication interface configured to configured to receive key code data, the key cutting machine configured to use the received key code data to manufacture a key to match the lock cylinder produced using the pin code data.

10. The system of claim 1, further comprising a key cutting machine having a communication interface configured to configured to receive key code data corresponding to the pin code data, from the remote computing device, the key cutting machine configured to use the received key code data to manufacture a key to match the lock cylinder produced using the corresponding pin code data.

* * * * *